PATTERN RECOGNITION APPARATUS

Filed March 29, 1965

INVENTOR.
ROBERT D. HAWKINS
BY
H P Terry
ATTORNEY

INVENTOR.
ROBERT D HAWKINS
BY
ATTORNEY

INVENTOR.
ROBERT D. HAWKINS
BY
H. P. Terry
ATTORNEY

United States Patent Office 3,453,596
Patented July 1, 1969

3,453,596
PATTERN RECOGNITION APPARATUS

Robert D. Hawkins, Greenlawn, N.Y., assignor to Sperry Rand Corporation, Great Neck, N.Y., a corporation of Delaware Filed Mar. 29, 1965, Ser. No. 443,447
Int. Cl. G06k 9/08
U.S. Cl. 340—146.3 4 Claims

ABSTRACT OF THE DISCLOSURE

Pattern recognition apparatus which utilizes the memory and correlation capabilities of a fiber optic array having a plurality of energy transmitting fibers vibratable at individual preselected frequencies for providing a measure of the correlation between the pattern to be recognized and a programmed characterization.

Figures 1, 1A:
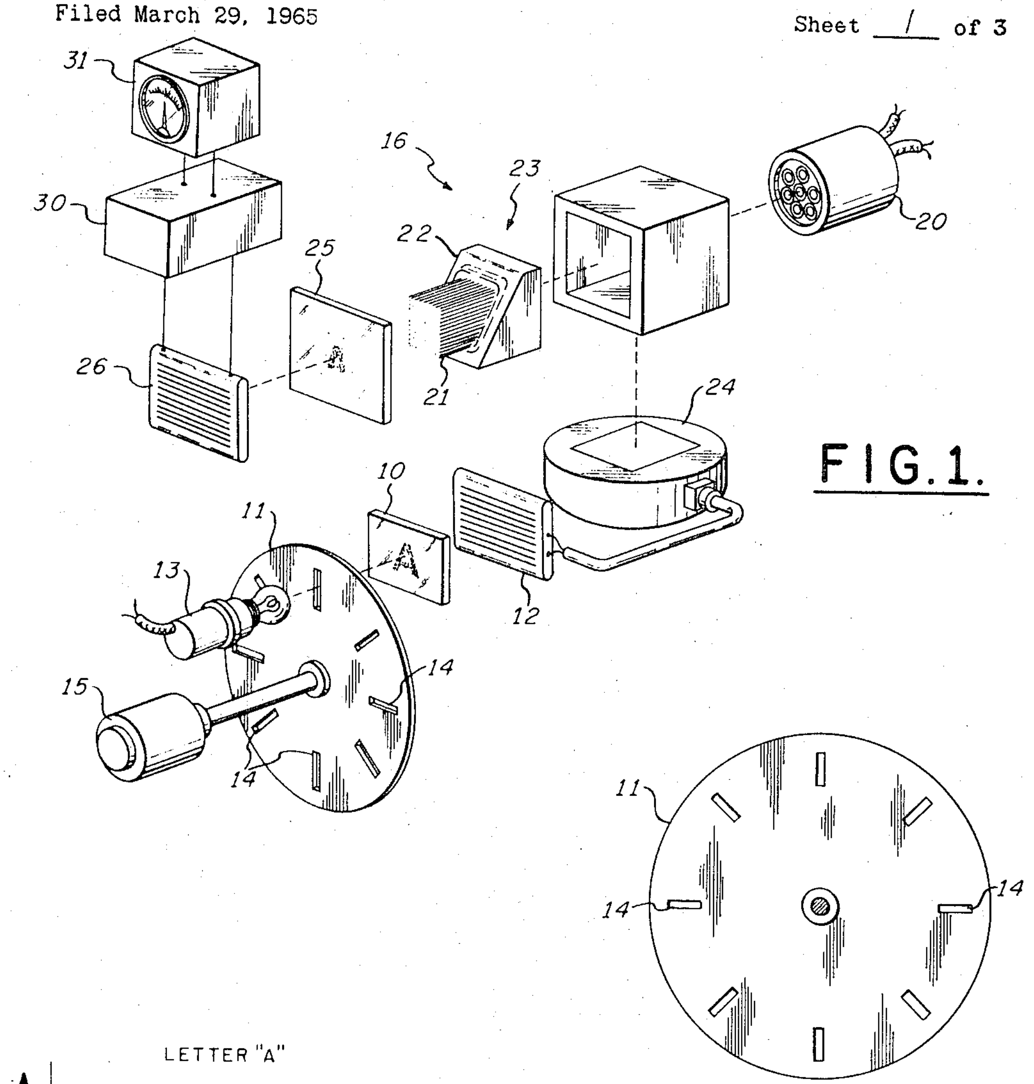

The present invention relates to apparatus for recognizing a form or character recorded upon a contrasting medium.

The recognition of forms particularly those involving complex patterns and distinguishing a predetermined form or pattern from one very similar to it is extremely difficult to accomplish automatically and accurately. This problem is particularly acute when the form or pattern has variable characteristics due to other superimposed information or background noise.

A class of form or pattern recognition is that of charactor recognition where the character is an alpha-numeric shape such as the alphabet or numerals. Converting alpha-numeric characters automatically into signals suitable for use in data processing apparatus has heretofore required extremely complex electronic equipment. Further, the degree of accuracy required for the conversion from alpha-numeric characters to a binary code, for example, dictates the complexity of the electronic apparatus.

Prior art character recognition apparatus have suffered from several disadvantages including:

(1) The characters to be read had to be intentionally deformed or stylized in order to be converted to a binary code. For example, characters used on checks in accordance with the American Bankers Association E–13–B font. In addition, printing means having special type faces must be employed for printing characters of this type.

(2) The stored characteristics for each character to be recognized was fixed and permanently wired into the computer memory for example, a magnetic core matrix. This made is impractical to readily change the memory for recognition of other type fonts. It also required in every case a prior study of each individual letter's characteristics as produced by the scanning means so that the memory could be manually prepared.

The above disadvantages have restricted the practical use of automatic reading machines to well controlled types of material and the great majority of typewriters, hand-printed and machine-printed records normally used by people cannot be read by machines without excessive costs and complexity.

It is an object of the present invention to provide apparatus for recognizing a form and discriminating it from different forms.

It is another object of the present inventon to provide apparatus for recognizing one form from other forms normally indistinguishable to the human faculties without aids or special training.

It is a further object of the present invention to provide character recognition apparatus for recognizing alpha-numeric characters that is versatile and relatively simple.

The above objects are achieved by programming a masking means in accordance with the form to be recognized and disposing the masking means close to the free ends of a plurality of energy transmitting fibers supported in a mounting means to vibrate at varying resonant frequencies with each of the fibers having one end free to vibrate relative to said masking means. The form to be recognized is scanned and encoded in order to provide a signal representative of the form with respect to the medium upon which it is recorded. Transducer means responsive to said scanning means vibrates the mounting means in order that certain fibers vibrate and others remain relatively stationary. With the mask programmed to recognize said form, the energy transmitted through the tö recognize said form, theenergy transmitted through the masking means provides a signal representative of the correlation between the form and the programmed characterization. The present invention is capable of recognizing many types of complex patterns which can be transformed to a time wave including visual images.

Figure 2A:
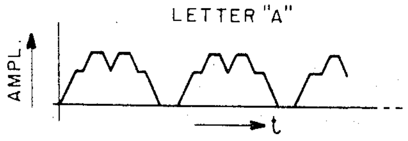
Figure 2B:
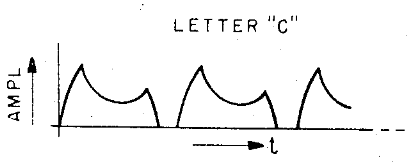
Figure 2C:
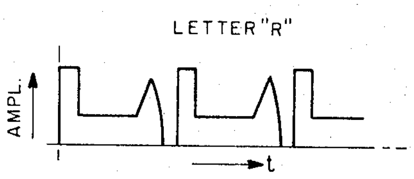
Figure 3:
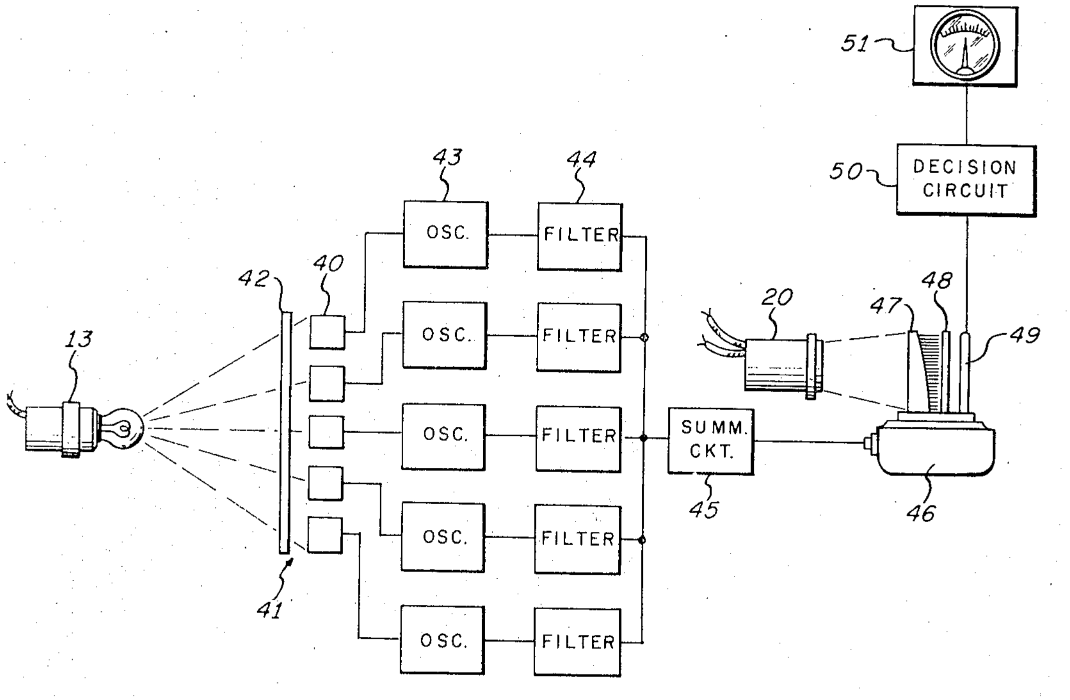
Figure 5:
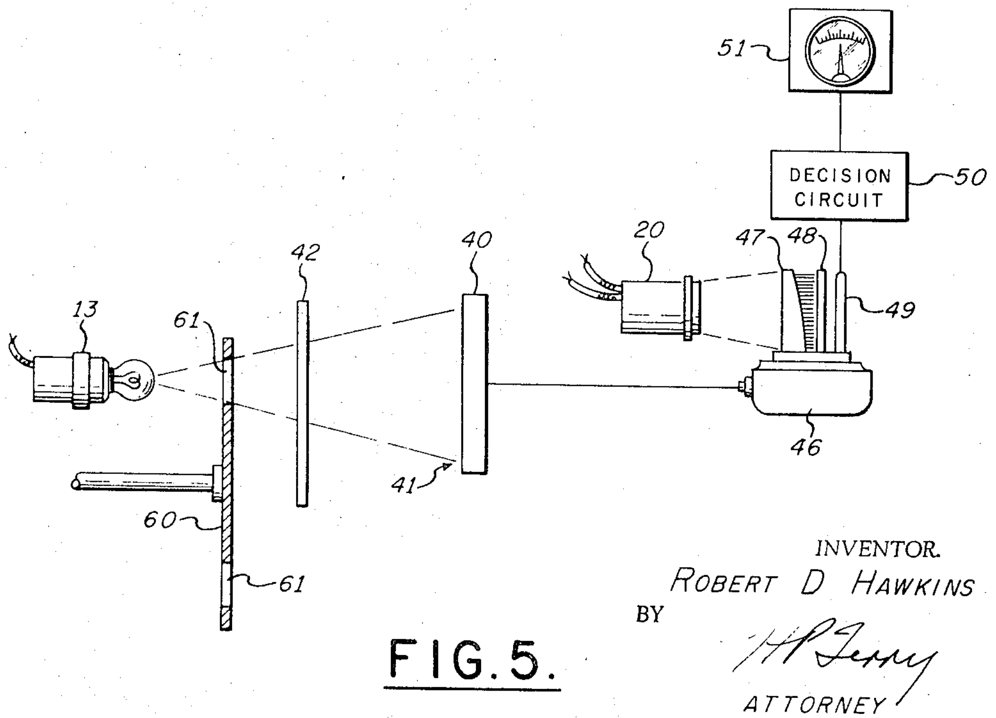
Figure 4A:
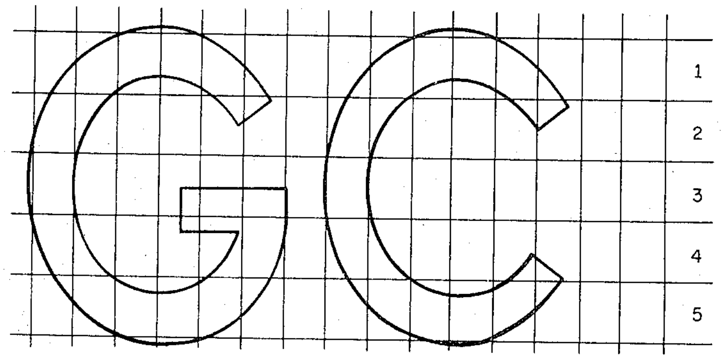
Figure 4B:
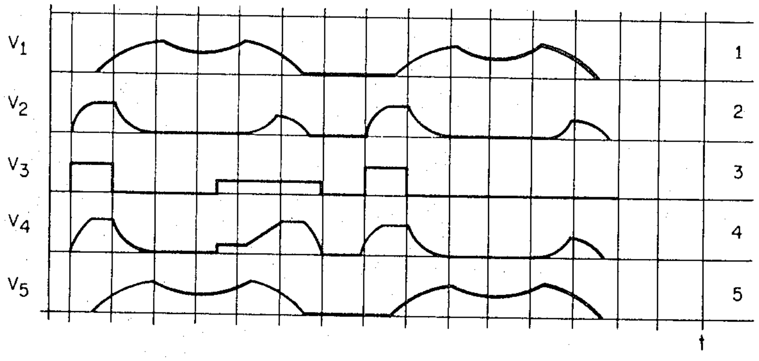
Figure 4C:
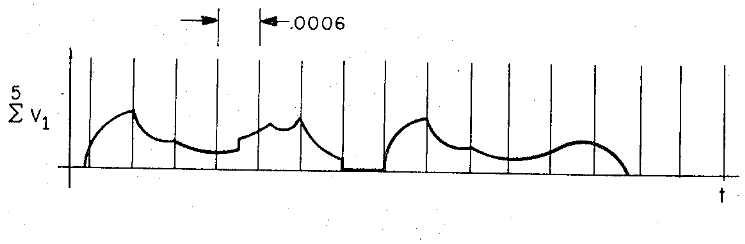
Figure 6:
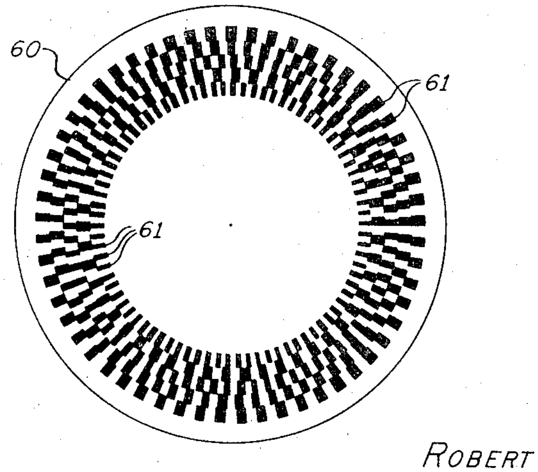

These and other objects will become apparent by referring to the drawings in which:

FIG. 1 is a schematic diagram of a visual character recognition apparatus;

FIG. 1*a* shows a typical slitted scanning disc;

FIGS. 2*a* to *c* represent the voltage time signals of the letters A, C, and R respectively;

FIG. 3 is a schematic diagram of a line scanning type of form recognition device;

FIGS. 4*a* to *c* are typical scan signals showing the difference between the similar letters G and C;

FIG. 5 is a schematic diagram of an alternative type of recognition apparatus using an encoded scanning disc; and FIG. 6 shows a typical encoded scanning disc.

The apparatus of the present invention recognizes forms, patterns, shapes, or characters for which it has been programmed. For purposes of example, the present invention will be described with respect to a character recognition apparatus although it will be appreciated that the invention is equally applicable to recognize any other type of form, pattern or shape. The form may even be composed of areas of different intensity; the only criteria being that the form must be of a contrasting nature with respect to the background upon which it is disposed.

Referring to FIG. 1, it will be assumed that the present invention is arranged to recognize an alpha-numeric such as the letter A of the alphabet. The character A is disposed on a transparency 10, for example, with the letter A being opaque while the background is transparent. The transparency 10 is disposed between a slitted scanning disc 11 and a photocell 12. A light source 13 is arranged to transmit light through the slits 14 in the scanning disc 11 through the transparent portions of the transparency 10 to fall upon photocell 12. The slitted scanning disc 11 may be of the type shown in FIG. 1*a* having a plurality of slits 14. When the slits 14 are aligned with the character A on the transparency 10 a beam of light is transmitted from the light source through the narrow slit 14 and the transparent portions of the transparency 10. The propagation of light transmitted through the transparency 10 depends upon the optical properties of the character disposed thereon and is thus characteristic of a given alpha-numeric character, i.e., A. The photocell 12 senses the light transmitted through the transparency 10 and responds to the instantaneous total amount of light which emerges after being transmitted through the transparency 10. In general, this quantity is varying as the slit of light sweeps across the alpha-numeric character on the transparency 10 and the photocell output is a signal which varies in like manner. The scanning disc 11 is rotated by a drive motor 15 as a function of the characteristic of the transparency 10 and the photocell 12. The photocell 12 may be of any conventional type to provide an electrical output proportional to the amount of light impinging thereon, for example, photoconductive cells which change their electrical resistance to luminescence and photoelectric cells which provide an electrical current output are both suitable.

In order to automatically and accurately recognize and compare the character on the transparency 10, the output of the photocell 12 is connected to energize a transducer of a Sceptron(TM) pattern recognizer assembly 16. The Sceptron pattern recognizer assembly 16 may be of the type disclosed in U.S. patent application S.N. 185,064 entitled "Frequency Responsive Apparatus" filed Apr. 4, 1962 and now U.S. Patent No. 3,213,197 in the name of Robert D. Hawkins and consists of a collimated light source 20 which transmits light through a plurality of optic fibers 21 cantilevered from a mounting base 22 that is contoured in order that the optic fibers 21 extend from the mounting base 22 at unequal free lengths whereby they may vibrate at individual preselected frequencies associated with their various natural frequencies. The base 22 may be shaped to provide any reasonable audio frequency transfer function to be generated from the output of the array 23. Each of the optic fibers 21 transmits a beam of light emitted from the source 20 with the fibers 21 being of very small size, for example, .002" in diameter. Several thousand flexible fibers may be cantilevered from a very small base 22 to form a compact array 23, by utilizing the method disclosed in U.S. patent application S.N. 363,470 entitled "Method of Making Frequency Responsive Devices" filed Apr. 29, 1964 and now U.S. Patent No. 3,333,279 in the names of Colen and Marchese. The array 23 is mounted on an electromechanical transducer 24 which is energized by the output signal of the photocell 12. If desirable, the output signal of the photocell 12 may be amplified by conventional means not shown. Each of the fibers 21 responds to the vibration of the drive coil 24 in a manner characteristic of its resonant frequency and mechanical Q as more fully explained in said U.S. application S.N. 185,-064, now Patent No. 3,213,197.

The beams of light from the fibers 21 are projected upon a photographic mask 25 which has been previously programmed to discern the desired character, i.e., the letter A. A detector or photocell 26 is disposed to receive the light transmitted through the mask 25 from the ends of the optic fibers 21. The photocell 26 thus integrates the light received from all of the fibers 21 for a time interval consistent with the application. The photographic mask 25 is the adaptive memory of the system and is programmed to provide the desired characteristic by exposing it in the manner disclosed in U.S. patent application S.N. 284,712, now Patent 3,394,976, entitled "Frequency Responsive Device" filed May 31, 1963 in the name of Robert D. Hawkins, to the light transmitted from the fibers 21 during receipt of the desired signal. Vibrating the array 23 in response to a particular signal from the photocell 12 causes certain of the fibers 21 to vibrate while others remain stationary. Scanning of the unknown pattern on the transparency 10 provides a signal from the photocell 12 which is compared to the programmed signal on the mask 25 in order that the photocell 26 measures the correlation between the unknown signal from the photocell 12 and the programmed signal on the mask 25. The photocell 26 may be connected to provide binary coded information to convert the alpha-numeric to machine language for use in a data processing or may be connected as shown to a decision circuit 30 which provides a signal to an indicator 31 if the correlation signal from the photocell 26 exceeds, for example, a predetermined threshold value. Although only one array 23 and associated mask 25 and detector 26 are shown for purposes of explanation, it will be appreciated that usually a plurality of them are utilized.

The key to sophisticated recognition lies in the proper utilization of masking techniques. By employing photographic emulsions having a wide exposure latitude, and by using superimposition techniques, a great variety of masks can be generated. It is through the use of such techniques that the dominant properties of a set of signals are extracted and similarity evaluations are made.

The basic unit is the static mask made by exposing a photographic plate to the fiber tips in their rest position (no signal), and developing the plate as a negative. The mask thus has a black dot in front of each fiber and provides zero light output when there is no signal. When a signal is received, the fibers vibrate away from the black dots and light is transmitted.

Other masks are variations of two basic types, the rejection mask and the acceptance mask. When a signal is stored for the Sceptron pattern recognizer, the total program consists of a combination of these type of masks.

The rejection mask is obtained by exposing the photographic plate to fiber motion during receipt of the desired signal, and developing the plate as a negative. The resulting mask has a dot in front of each fiber and is also opaque in the region of fiber motion. When the desired signal is received, the mask will pass a minimum of light. When any other signal is received, different fiber motion will result, and light will pass through the mask. This light which passes the rejection mask is a measure of the difference or dissimilarity between the programmed signal and the received signal.

The acceptance mask is a combination of the static mask and the negative of the rejection mask; that is, the photographic plate of the signal is developed as a positive, and the static dots are superimposed. This mask passes a maximum amount of light when the programmed signal is received. The light which passes the acceptance mask is therefore a measure of the similarity of the received signal to the programmed signal.

A more optimum discrimination of encoded patterns can be achieved if both acceptance and rejection masks are used in combination, particularly in a combination where the output of the rejection mask as measured by a photocell is subtracted from the output of the acceptance mask as measured by another photocell. Both masks may be located on adjacent and like portions of a common fiber optic array mounted on a common electromechanical transducer.

The masks for different patterns may be made interchangeable with respect to a particular Sceptron pattern recognition assembly thereby providing extremely good versatility.

The amount of information in a visual image is determined by its resolution. On black and white prints, the resolution is specified in lines per millimeter. These resolving lines cross-hatch the image into binary digits, that is, alternating black and white squares. Thus, the information is equal to the square of the line resolution, or the area resolution. If the image is not black and white, additional information is contained in the resolving power of the third dimension, i.e., the gray or color spectrum. Thus, the information content does not depend upon what is depicted, but on the resolution of the image and its size. A white sheet of paper with a black dot in the center contains the same amount of information as a printed page of the same size and resolution. The message contained on an image is the relevant information contained on a background of irrelevant information.

In adapting visual patterns to a reading machine, the image is converted to a voltage-time wave. The information content is then measured by the frequency bandwidth-time duration product. The information contained in a time signal of bandwidth B and duration T is BT. If all of the information contained on an image is extracted by the scan mechanism, then the voltage-time signal produced will have the same information content as the image. If the information content of an image is 100 (the image can be resolved into 100 distinct areas), the bandwidth-duration product is 100 provided all of the information is retained in the transformation. In this case, observing the image for one second yields an output with a bandwidth of 100 c.p.s. If the image is scanned for only one millisecond, the bandwidth is increased to 100,000 c.p.s.

Printed characters are often images of relatively high resolution yet of low relevant information content or message, i.e., if faithfully converted, excessive bandwidths are required to carry litle relevant information. This is avoided by filtering, that is, by employing a scanning slit larger than the resolution unit of the image. Then the size of the slit determines the resolution and, consequently, the frequency content.

Typical scan outputs from the photocell 12 are shown in FIGS. 2*a*–2*c* and represent the voltage time waves of the letters A, C, and R, respectively.

An alternative form of recognition device which permits a printed shape to be swept line by line at a constant velocity is shown in FIG. 3. Each line of print is simultaneously scanned by a plurality of vertical photocells 40 in a read head 41. In the example shown, vertical resolution is provided by 5 vertically disposed photocells 40. The photocells 40 are aligned perpendicularly to the direction of motion of the page and line to be scanned and divide each line of printed characters into 5 horizontal strips. The number of vertically disposed photocells required depends upon the vertical resolution necessary for satisfactory recognition.

When scanning an opaque background the light source is contained in the read head 41 and the reflected light is detected by the photocells 40. If the background is transparent, the light source 13 is disposed as shown in FIG. 3 to transmit light through the page 42.

The output of each of the photocells 40 is connected to its respective fixed frequency oscillator 43 to provide amplitude modulation. For a reading speed of 250 characters per second, the minimum relevant frequency of the sensing element output is 250 c.p.s. The maximum frequency component of this output depends upon the horizontal resolution as dictated by the horizontal dimension of the scanning spot. For a ratio of character width to a spot width of 10, the maximum frequency of the output is 2500 c.p.s. This resolving power in the horizontal or read direction is twice as great as the vertical resolution but is deemed necessary to combat possible image crowding which could cause "cl" to be read as "d." Thus, the significant frequency range of the output of each of the five sensing elements is initially 250 to 2500 c.p.s. The five fixed frequency oscillator carrier frequencies to be modulated could be 12.5, 15.0, 17.5, 20.0 and 22.5 kc., for example. Each of the oscillators 43 is connected to a respective high pass filter 44. By detecting only the upper sideband of each signal by means of the filters 44, the frequency band 12.5 kc. to 25.0 kc. is covered with no overlap. The filters 44 are connected to a summing circuit 45 in order that the five modulated carrier signals are added to form a single broadband input signal which is connected to drive the electromechanical transducer 46 that vibrates the fiber array 47 in a manner similar to that explained above with respect to FIG. 1.

Typical scan signals from the photocells 40 are shown in FIGS. 4*a–c* with respect to the letters G and C. FIG. 4*a* shows the letters G and C with the small numerals to the right indicating the relative vertical positions of the photocells 40, for horizontally scanning the letters G and C. FIG. 4*b* shows a voltage amplitude versus time graph as the letters are transposed relative to the photocells 40 at varying instances of time. FIG. 4*c* is a composite signal showing the sum of the individual signals from the photocells 40 that clearly illustrates the distinction in the composite electrical signals of the letters G and C which appear quite similar visually.

The fundamental problem of pattern recognition is the determination of the class or category of an event. Characteristics of the event are measured. These measured values are compared to stored values of the same measurements, made upon known members of the various possible categories. On the basis of these comparisons, the degree of similarity between the event and the members of each category is established. The event is labelled a member of that category to which it is most similar.

The approximately 81 possible printed characters are the categories of the reading problem. The occurrence of a printed character is an event that must be classified as one of these 81. The present invention may make hundreds of measurements of each event for example, these measurements are the motions of each fiber during receipt of the unknown signal or event. These are time-dependent spectral measurements. Fiber motion is zero (neglecting noise) before the signal arrives. During receipt of the signal, fiber motion will rise and decay but will not exceed the range of linear response. At the end of the signal, the distribution of fiber amplitudes is an approximate Fourier integral representation of the signal.

Programming of the category masks is accomplished by exposing the photographic emulsion to fiber motion during the final portion of the isolated signals. During reading, the initial fiber motions will be influenced by the previous character. These initial conditions will have decayed by the latter portions of the signal.

The best description of a pattern category is the set of known members of that category. The problem of classifying events would be simplified if all known members of each category were stored, and new patterns compared with all of them. A memory could easily be developed that would leave little likelihood of errors occurring in the classification process. However, for most recognition problems, storage capacity would be enormous and access time excessive. Thus, instead of storing all known members of a group, it is generally more practical to store a single pattern which is an appropriate statistical representation of the group.

In programming the present invention, such an image is obtained by exposing the photographic plate to the known members of the category sequentially and at low light intensity. If exposure and development are controlled so that the linear range of the emulsion is not exceeded, the mask is grayed in proportion to exposure. Fiber motion characteristic of all signals are continually reinforced to cause an adequate exposure while motion occurring for only a small sample of the members does not result in significant exposure density. Obviously, this technique results in a relaxation of the rules for class membership. That is, as recognition of a greater population of members is provided for, it becomes easier for non-members to slip in. This difficulty can be overcome by using more than one array and mask to define the category. Thus, a single category might be defined by several masks, each one containing one or more exposures; in effect, a compromise between storing a single statistical image and storing the image of each and every known member.

Access time is not a problem because all the units, regardless of the number, may be driven in parallel from a common source. Nor is storage capacity of great concern since the arrays and masks are very small.

Thus the output signal from the summation device 45 may be connected to simultaneously drive a plurality of electronic transducers 46 each having a single array 47 and mask 48 disposed thereon similar to that shown with respect to 23 in FIG. 1 or preferably the output signal from summation device 45 is connected to drive a common transducer 46 which has mounted thereon all the arrays 47 and masks 48 necessary for a particular alpha-numeric code. For example, in this instance, 81 arrays would be required. The photocells 49 associated with each of the arrays 47 then provide output signals which may be adapted to data processing apparatus or each may be connected as shown to decision circuits 50 to provide energization of a particular decision circuit when a threshold value is reached. The decision circuits 50 may in turn be connected to an indicator 51 to provide a visual indication.

In lieu of utilizing a slitted scanning disc 11 of the type shown in FIG. 1*a*, an encoded scanning disc 60 may be utilized disposed between the light source 13 and the page 42 if either the background or the characters of the page 42 is transparent or it may be disposed as explained with respect to FIG. 3 between the page 42 and the photocells 40 if the background of page 42 is opaque. As shown in FIG. 6, the encoder disc 60 has a plurality of vertically arranged encoding portions 61 each associated with a respective photocell position 40 and each providing a different relative frequency, the absolute values of which are dependent upon the speed of the disc 60 and the physical spacing of the opaque and transparent encoding markings on the disc 60. In other respects the system of FIG. 5 operates substantially as shown and explained with respect to FIG. 3 except, of course, the divided photocell 40 and the separate oscillator circuits 43 are unnecessary since this information is provided by the encoded portion 61 of the disc 60.

It will be appreciated that with the unusually large number of information channels in each array, i.e., each channel being defined by an optic fiber, and because of the large number of the arrays which can be utilized to define a signal, the recognition and classification process can be made extremely accurate and as reliable as desired.

While the invention has been described in its preferred embodiments, it is to be understood that the words which have been used are words of description rather than limitation and that any changes within the purview of the appended claims may be made without departing from the true scope and spirit of the invention in its broader aspects.

What is claimed is:

1. In apparatus for recognizing a form recorded upon a medium, (a) scanning means for scanning said form for providing a scanning signal representative of the contrast of said form with respect to said medium, (b) means including a plurality of energy transmitting fibers supported to extend from mounting means at unequal free lengths whereby said fibers vibrate at individual preselected frequencies associated with their respective resonant frequencies with each of said fibers having one end free to vibrate relative to masking means disposed close to said free ends, said masking means being programmed to characterize said form, (c) transducer means responsive to said scanning signal for vibrating said mounting means in accordance therewith whereby certain of said fibers remain stationary and others vibrate, and (d) means responsive to the energy transmitted from said fibers through said masking means for providing a signal representative of the correlation between said form and said programmed characterization.

2. In apparatus for recognizing forms recorded upon a medium, (a) scanning means for scanning portions of said forms for providing a plurality of scanning signals representative of the contrast of said portions of said forms with respect to said medium, (b) means including a plurality of energy transmitting fibers supported to extend from mounting means at unequal free lengths whereby said fibers vibrate at individual preselected frequencies associated with their respective resonant frequencies with each of said fibers having one end free to vibrate relative to masking means disposed close to said free ends, said masking means being programmed to characterize said forms, (c) transducer means responsive to said scanning signals for vibrating said mounting means in accordance therewith whereby certain of said fibers remain stationary and others vibrate, and (d) means responsive to the energy transmitted from said fibers through said masking means for providing a signal representative of the correlation between said forms and said programmed characterization.

3. In apparatus for recognizing characters recorded upon a medium, (a) scanning means for scanning portions of said characters for providing a plurality of scanning signals representative of the contrast of said portions of said characters with respect to said medium, (b) frequency generating means responsive to said scanning signals for providing frequency signals each having a distinctive frequency and amplitude representative of the scanned portions of said characters, (c) summation means responsive to said frequency signals for providing a composite signal representative of the amplitudes and frequencies of said frequency signals, (d) means including a plurality of energy transmitting fibers supported in mounting means to vibrate at varying resonant frequencies with each of said fibers having one end free to vibrate relative to masking means disposed close to said free ends, said masking means being programmed to characterize said characters, (e) transducer means responsive to said composite signal for vibrating said mounting means in accordance therewith whereby certain of said fibers remain stationary and others vibrate, and (f) means responsive to the energy transmitted from said fibers through said masking means for providing a signal representative of the correlation between said characters and said programmed characterization.

4. In apparatus for recognizing characters recorded upon a medium, (a) scanning means for scanning portions of said characters for simultaneously providing a plurality of scanning signals representative of the contrast of said portions of said characters with respect to said medium, (b) frequency generating means responsive to said scanning signals for simultaneously providing a first plurality of signals each having a distinctive frequency and an amplitude representative of the contrast of said scanned portions of said characters with respect to said medium, (c) summation means responsive to said first signals for providing a composite signal representative of the amplitudes and frequencies of said first signals, (d) means including a plurality of energy transmitting fibers supported in mounting means to vibrate at varying resonant frequencies with each of said fibers having one end free to vibrate relative to masking means disposed close to said free ends, said masking means being programmed to characterize said characters, (e) transducer means responsive to said composite signal for vibrating said mounting means in accordance therewith whereby certain of said fibers remain stationary and others vibrate, and (f) means responsive to the energy transmitted from said fibers through said masking means for providing a signal representative of the correlation between said characters and said programmed characterization.

References Cited

UNITED STATES PATENTS 3,213,197 10/1965 Hawkins ------------- 179—1

MAYNARD R. WILBUR, *Primary Examiner.*

R. F. GNUSE, *Assistant Examiner.*

U.S. Cl. X.R.

356—71